United States Patent
Bannon

(10) Patent No.: US 8,517,353 B2
(45) Date of Patent: Aug. 27, 2013

(54) APPARATUS AND PROCESS FOR DISTRIBUTING VAPOR AND LIQUID PHASES

(75) Inventor: Timothy Michael Bannon, Downers Grove, IL (US)

(73) Assignee: UOP LLC, Des Plaines, IL (US)

( * ) Notice: Subject to any disclaimer, the term of this patent is extended or adjusted under 35 U.S.C. 154(b) by 339 days.

(21) Appl. No.: 12/890,988

(22) Filed: Sep. 27, 2010

(65) Prior Publication Data

US 2012/0073663 A1 Mar. 29, 2012

(51) Int. Cl.
*B01F 3/04* (2006.01)

(52) U.S. Cl.
USPC ........................................ 261/110; 261/114.5

(58) Field of Classification Search
USPC ................... 261/97, 110, 114.1, 114.2, 114.5
See application file for complete search history.

(56) References Cited

U.S. PATENT DOCUMENTS

| | | | |
|---|---|---|---|
| 1,736,845 A * | 11/1929 | Chillas, Jr. | 261/114.2 |
| 1,741,519 A * | 12/1929 | Huff | 261/114.2 |
| 2,477,186 A | 7/1949 | Koehler | |
| 3,055,646 A | 9/1962 | Eld et al. | |
| 3,417,975 A | 12/1968 | Williams et al. | |
| 3,824,080 A | 7/1974 | Smith et al. | |
| 3,824,081 A | 7/1974 | Smith et al. | |
| 4,140,625 A | 2/1979 | Jensen | |
| 4,711,745 A | 12/1987 | Lockett et al. | |
| 4,792,229 A | 12/1988 | Frohnert et al. | |
| 5,158,714 A | 10/1992 | Shih et al. | |
| 5,232,283 A | 8/1993 | Goebel et al. | |
| 5,484,578 A | 1/1996 | Muldowney et al. | |
| 5,690,896 A | 11/1997 | Stangeland et al. | |
| 5,837,208 A | 11/1998 | Grott et al. | |
| 5,942,162 A | 8/1999 | Gamborg et al. | |
| 6,183,702 B1 | 2/2001 | Nguyen et al. | |
| 6,769,672 B2 | 8/2004 | Müller | |
| 7,234,692 B2 * | 6/2007 | Dichtl et al. | 261/114.2 |
| 7,506,861 B2 * | 3/2009 | Muller | 261/97 |
| 7,600,742 B2 | 10/2009 | Breivik | |
| 7,674,439 B2 | 3/2010 | Jacobs et al. | |
| 2004/0065966 A1 | 4/2004 | Muller | |
| 2009/0177023 A1 | 7/2009 | Koudil et al. | |
| 2009/0294997 A1 | 12/2009 | Monkelbaan | |

FOREIGN PATENT DOCUMENTS

JP 2009235060 A 10/2009

OTHER PUBLICATIONS

Tsuchiya et al.; Prediction of the bubble-hole size of a cap bubble in a bubble swarm; Source: Chemical Engineering Science, v 52, n 5, p. 775-785, Mar. 1997.

* cited by examiner

*Primary Examiner* — Charles Bushey
(74) *Attorney, Agent, or Firm* — Mark R Willis

(57) ABSTRACT

Apparatuses and methods are disclosed for distributing vapor and liquid flow. Problems with maldistribution, due to out of level positioning of the distributor tray, are addressed by varying the height of the caps and/or their openings to control the liquid flow profile (distribution) that results due to the rising liquid level.

20 Claims, 4 Drawing Sheets

APPARATUS AND PROCESS FOR DISTRIBUTING VAPOR AND LIQUID PHASES

FIELD OF THE INVENTION

The present invention relates to apparatuses, and processes using the apparatuses, for distributing a vapor and a liquid. In the apparatuses, respective highest or lowest openings (e.g., top and/or side openings) for fluid flow through different elongated caps are at different heights above a tray, from which the caps extend. Fluid maldistribution is thereby reduced or eliminated, for example when the tray is not completely level.

DESCRIPTION OF RELATED ART

Devices for distributing vapor and liquid phases are used in a wide range of industrial applications, including petroleum refining and petrochemical production processes. For example, devices for distributing downflowing vapor and liquid phases comprising, respectively, predominantly hydrogen and hydrocarbons, are frequently used in refinery hydroprocessing operations, especially in hydrocracking and hydrotreating reactors.

In many applications involving the flow of vapor and liquid phases, maintaining uniform flow rate (e.g., plug flow) and temperature profiles, over a cross section perpendicular to the flow direction, is extremely important to the overall process, for example involving reaction between the flowing vapor and liquid in the presence of a fixed bed of catalyst particles. Also, these flow rate and temperature profiles can interact, since a maldistribution of either the vapor or the liquid flows can result in a change in the temperature profile and vice versa. This interaction is highly critical to the successful long term operation of a refinery hydroprocessing reactor or other type of reactor where it is desired to run with a single load of catalyst for an extended period of time. Hydrocracking and other hydroprocessing reactions, including hydrotreating (e.g., hydrodesulfurization) reactions are very exothermic, such that the temperature of the downward flowing vapor and liquid reactants increases substantially with the extent of completion of the reaction. Also, the performance of the catalyst, and particularly its ability promote conversion to the desired products in the highest possible yield over the longest possible period, is highly dependent upon the temperature at which it is operated. Therefore, the exothermic nature of the reaction affects the performance of the catalyst and overall process.

Maldistribution and/or inadequate mixing of the reacting vapor and liquid phases can cause localized temperature excursions ("hot spots") that lead to uncontrollable losses in desired product yield and catalyst stability, due to the formation of non-selective products (e.g., very light, low-value hydrocarbons such as methane and very heavy hydrocarbons such as coke and coke precursors that remain deposited on the catalyst and deactivate it). Vapor and/or liquid flow maldistribution can therefore lead to overall reductions selectivity to desired product(s) and/or catalyst activity (i.e., conversion at a given temperature), such that it may be necessary to operate the reactor at a higher temperature to achieve a desired conversion (at the expense of selectivity) or to restrict the feed flow rate to the reactor to achieve a desired product yield. In either case, the overall capacity of the process for the desired product is reduced, and overall process economics become less favorable.

Moreover, since the accelerated catalyst coke formation resulting from localized temperature excursions prematurely decreases catalyst life, more frequent shutdowns of the process may be required to exchange the spent catalyst for fresh or regenerated catalyst. This further negatively impacts process economics, as the shutting down, reloading, and restarting of a hydroprocessing reactor are both complicated and time consuming operations that can remove not only the hydroprocessing unit, but also associated upstream or downstream units, from operation. The throughput of the entire refinery may be adversely affected. Sub-optimum product quality and/or operating capacity, in addition to premature shutdowns of the reactor, all have significant negative economic effects on the operation of a petroleum refinery.

In view of these significant drawbacks associated with fluid flow maldistribution, the prior art has expended considerable effort in providing apparatuses for uniformly mixing vapor and liquid phases and distributing them evenly, for example over the cross section of a hydroprocessing reactor or other hydrocarbon conversion reactor, and particularly a downflow reactor. Various apparatuses for distributing and/or mixing flows, and particularly with respect to catalytic reactors in which the apparatuses are used upstream of a catalyst bed or between catalyst beds, are described, for example, in U.S. Pat. No. 3,824,080; U.S. Pat. No. 3,824,081; U.S. Pat. No. 4,140,625; U.S. Pat. No. 5,158,714; U.S. Pat. No. 5,232,283; U.S. Pat. No. 5,690,896; U.S. Pat. No. 5,837,208; U.S. Pat. No. 5,942,162; U.S. Pat. No. 6,183,702; and U.S. Pat. No. 6,769,672. Such distributors may generally comprise a distribution tray (plate) with multiple passageways that are equipped with individual distributor assemblies, for example cylindrical tubes and bubble caps, which direct the flow of fluids in a particular manner with the objective of maximizing distribution and/or mixing.

Under ideal conditions, these prior art apparatuses generally provide reasonably even distribution of the vapor and/or liquid phases over a cross-sectional area adjacent to the tray. Ideal conditions include, for example, a level tray with each distributor assembly installed at the same height and operated with the same depth of surrounding liquid, at design vapor and liquid flow rates to the tray. However, deviations from ideal conditions invariably result in practice, and especially in the case of commercial operations in which trays are generally not completely level and may actually be installed with an offset in levelness, from one side of the tray to the other, of 1.3 cm (0.5 in) or more.

Installation irregularities, in which the distributor is positioned out of level, can result in uneven liquid levels on the tray. Otherwise, the forces generated by the flowing vapor and liquid phases during operation can similarly result in unevenness in liquid levels on the distributor tray. In hydroprocessing reactors, for example, these forces coupled with high pressures and temperatures tend to cause significant stress on the supports and other reactor internals. While the stresses are normally absorbed by support beams of the distributors and/or mixers, some deflection of trays can still occur. Liquid height gradients can also result when descending liquid falls onto the tray at only a few isolated points, such that the impact of this liquid causes localized liquid level disturbances and irregularities. Importantly, when uniformly configured fluid flow path distribution assemblies are subjected to different liquid levels on the tray, the paths taken by the vapor and liquid are no longer uniform. For example, liquid at a lower level around one assembly must travel a greater distance before reaching a level that allows it to exit through an opening on the assembly. Under such conditions, therefore, each of the assemblies, although uniformly configured, does not deliver the same flow rates of vapor and liquid as intended. Maldistribution of the vapor and liquid across the cross-sectional area below the tray (e.g., in a catalyst bed) increases as a result of non-uniform liquid levels on the tray.

A further cause of maldistribution is associated with the use of vapor and/or liquid flow rates outside an operating range over which a particular design of distributor or mixer is effective. Although such apparatuses are designed to function optimally under their normal operating conditions, it is appreciated that vapor and liquid flow rates, for example through a hydroprocessing reactor, will often change over time as a function of the reactor operating temperature (or other operating conditions), the composition of the feed, the product specifications, and/or the use of a different catalyst. For example, an increase in conversion of a hydrocracking reactor leads to increased vaporization of hydrocarbons as the products are reduced in molecular weight and are consequently more volatile. In this case, the average liquid level on a tray may decrease. In general, operating variations that result in a change in liquid flow rate to a distributor tray, depending on its design, can cause the level of liquid retained on that tray to change. Liquid maldistribution can result when vapor and liquid flows, in addition to liquid levels, are at values outside the design values for a particular apparatus.

Processes and apparatuses for distributing a vapor and a liquid should therefore ideally be able to effectively compensate for differences in the liquid depth surrounding individual distributor assemblies located on different parts of a tray. These processes and apparatuses should also be relatively insensitive to changes in the flow rates of vapor and/or liquid.

SUMMARY OF THE INVENTION

The present invention is associated with the discovery of advantages resulting from the use of non-uniform heights of openings, relative to a surface of a tray, of elongated caps extending above the surface. Compared to operation using uniform opening heights, for example, liquids on the tray have a reduced tendency to favor equilibration at a level corresponding to that of the openings, used for vapor and liquid passage through the caps. In general, as the liquid level increases to the height of a given opening and covers it, pressure drop across the tray increases. In view of the fact that large reactor plates generally have an offset in levelness, a large range of liquid flow rates will result in operation with a disproportionate quantity of the equilibrated liquid phase residing at or near the level of openings on one side of the reactor, thereby causing flow maldistribution.

This problem may be observed upon passing vapor and liquid flows through a plurality of elongated caps extending from a distributor tray covering a cross-sectional area of a vapor-liquid contacting apparatus such as a reactor. When the liquid flow rate is sufficient to cause a liquid level to reach highest openings of the caps, with these highest openings all being at the same height above the tray surface, the caps positioned at a lower (depressed) absolute level (e.g., due to the tray being installed out of level) pass a significantly greater liquid flow than caps positioned at a raised (elevated) absolute level. Moreover, covering of the openings by the liquid level at a given liquid flow rate increases the overall pressure drop across the tray, such that further increases in liquid flow do not necessarily result in significant, further increases in liquid level. In other words, the increased pressure drop and liquid flow rate tend to stabilize or equilibrate the liquid level near openings of caps in a depressed area of the tray. The problem is not easily remedied when liquid flow rate is changed, as higher flow rates do not lead to higher liquid levels that would result in covering the openings of caps in an elevated area of the tray.

The tendency of vapor and liquid distribution systems is therefore to remain in an operating regime in which the liquid level covers only, or at least predominantly, openings of caps in a localized, depressed region or side of the tray. The problem is difficult to correct by altering the liquid level due to the inherent "inertia" caused by the pressure drop changes discussed above. The same behavior is observed even in cases in which bottom liquid outlet openings of the caps are used in conjunction with top and side openings to aid in fluid passage. Since vessel internals are often installed, or often become, out of level with an offset of at least about 1.3 cm (0.5 in) from the most depressed to the most elevated portion or side of the tray, a large proportion of liquid resides in, and flows through, the depressed area when the liquid level is at or near the height of openings in the caps. Thus, whether or not bottom liquid outlet openings are used, the disproportionate flow of liquid in the depressed area of the tray results in maldistribution of both vapor and liquid flows, to the detriment of the entire process (e.g., hydrotreating or hydrocracking).

Apparatuses and processes according to the present invention advantageously overcome these drawbacks by varying the height of the caps and/or their openings to control the liquid flow profile (distribution) that results as the liquid level rises. For example, according to some embodiments the heights of caps, having top openings (i.e., in the case of open-ended caps), are varied above the top surface of a tray. In other embodiments, heights of highest openings, such as side openings, in closed-ended caps are varied. Combinations of open-ended and closed ended caps may also be used, the main consideration being that their highest openings (e.g., top or side openings), with respect to the distance from the top surface of the tray, are not uniform for all caps. This non-uniformity may be achieved by random or non-random varying of the highest openings. In the latter case, alternating highest openings, patterns of highest openings, or generally symmetrical configurations of highest openings (e.g., gradually increasing or decreasing heights of highest openings with increasing radial distance from the center of the tray) are possible. Any of these strategies may be employed for mitigating the maldistribution potential of vapor and liquid flows across the tray and moderating abrupt changes in pressure drop and flow rate as the liquid level rises to opening heights. The above noted "inertia," which tends to resist changes in the liquid level once it reaches opening heights, is also reduced by varying heights of the highest openings of the caps.

Accordingly, embodiments of the invention are directed to processes for distributing a vapor and a liquid. Representative processes comprise passing a vapor and a liquid through a plurality of elongated caps extending above a top surface of a tray. The caps may be open-ended or closed ended, and combinations of these types may be used. In any event, the caps have highest openings, whether at the tops of open-ended caps or at the sides of closed-ended caps. To provide varying opening heights, at least a first cap (i.e., a raised cap) has a highest opening at a greater height, compared to a highest opening of at least a second cap (i.e., a lowered cap). The height of openings is with respect to the top surface of the tray, which, as discussed above, may be out of level such that openings with different heights relative to the tray surface may actually be at substantially the same vertical position relative to grade level.

According to other embodiments, the caps have lowest openings (but not necessarily bottom liquid outlet openings)

with heights that may be varied, with respect to the top surface of the tray, in the manner discussed above for highest openings.

Further embodiments of the invention are directed to vapor-liquid contacting apparatuses (e.g., hydroprocessing reactors) comprising a vertically elongated vessel having disposed therein a tray covering all or a portion of cross-sectional area, such as a circular cross-sectional area, of the vessel and comprising a plurality of caps extending above the top surface of the tray and having varying opening heights as described above.

Yet further embodiments of the invention are directed to vapor-liquid distributors comprising a tray and caps extending above the top surface of the tray. The caps have varying opening heights as described above.

Still further embodiments of the invention are directed to processes for distributing a vapor and a liquid comprising passing the vapor and liquid either co-currently or counter-currently through vapor-liquid contacting apparatuses, or vapor-liquid distributors, as described above.

These and other embodiments and aspects relating to the present invention are apparent from the following Detailed Description.

Figure 1:
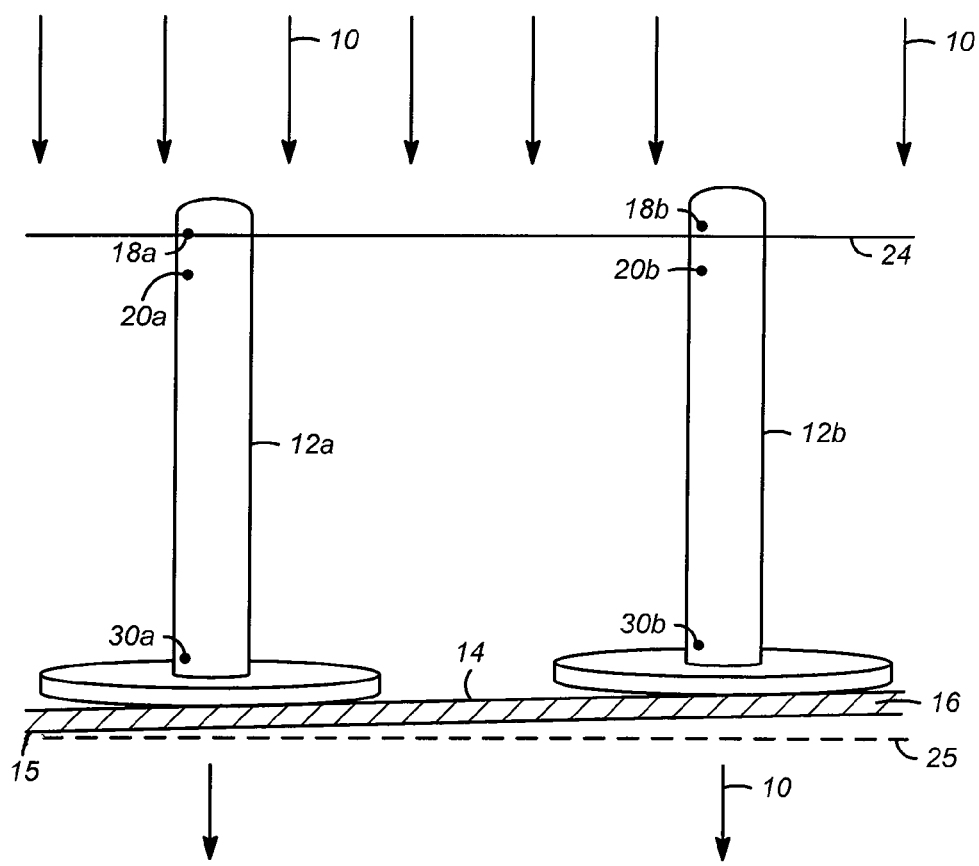
FIG. 1 is a side view of two representative caps of a vapor-liquid distributor. Highest openings of the closed-ended caps extend at the same height above a top surface of a tray, which is out of level with respect to grade.

The features referred to in FIGS. 1-5 are not necessarily drawn to scale and should be understood to present an illustration of the invention and/or principles involved. Some features depicted have been enlarged or distorted relative to others, in order to facilitate explanation and understanding. Vapor-liquid distributors, vapor-liquid contacting apparatuses using the distributors, and vapor-liquid distributing or contacting processes using the distributors or apparatuses, as disclosed herein, will have configurations, components, and operating parameters determined, in part, by the intended application and also the environment in which they are used.

DETAILED DESCRIPTION

The apparatuses and methods for vapor-liquid distribution and contacting are described herein particularly with respect to applications in which uniform distribution of vapor and liquid reactants of a reaction mixture is critical. Such applications include hydroprocessing, which encompasses hydrocracking and hydrotreating processes that are generally very exothermic and require significant attention directed at avoiding "hot spots" and even runaway reactions, which are often associated with flow maldistribution. The apparatuses and methods described herein, however, are broadly applicable to any number of applications involving contacting of a vapor and a liquid, with or without reaction between these phases to form new products. Such applications include refinery and petrochemical production operations including reforming, isomerization, hydrogenation, dehydrogenation, alkylation, cyclization, disproportionation, polymerization, etc. Further applications include those which rely on vapor-liquid contacting, but not necessarily reaction, such as distillation, absorption, and stripping.

The apparatuses and methods are especially suitable in applications involving co-current contacting between vapor and liquid phases, particularly where these phases both flow in the downward direction through a plurality of elongated caps from above the top surface of a tray. The downward flow is namely in relation to caps extending in the upward direction, above a top surface of the tray, as described in greater detail below. In the case of hydroprocessing applications, the vapor generally comprises hydrogen, and may be predominantly hydrogen, while the liquid generally comprises hydrocarbons, and particularly those derived from crude oil, such as straight run crude oil atmospheric or vacuum distillation. Distribution and/or contacting according to other embodiments, however, can involve co-current flows of vapor and liquid phases in the opposite direction, relative to the direction of extension of the caps from the tray surface. Yet further embodiments (e.g., involving distillation) can involve counter-current contacting between vapor and liquid phases, with upward flowing vapor and downward flowing liquid or vice versa. Therefore, references to "top," "bottom," "raised," "lowered," "elevated," "depressed," "highest," "lowest," and the like are meant to indicate relative positions and directions, as well as aid understanding, according to various specific embodiments, but these terms are not meant to limit the invention.

In the distributor depicted in FIG. 1, both vapor and liquid phases flow downward, as indicated by the direction of arrows 10. The vapor and liquid pass through first and second elongated caps 12a, 12b which may be open-ended (i.e., having a top opening) or otherwise closed-ended as shown in the embodiment of FIG. 1. First and second caps 12a, 12b extend above top surface 14 of tray 16 that covers a cross-sectional area (e.g., a circular cross-sectional area) of a reactor or other type of vapor-liquid contacting apparatus. Tray 16 generally covers the entire cross-sectional area, but may in some embodiments only partially cover this area. The closed-ended, first and second caps 12a, 12b, as shown in FIG. 1, have highest and lowest side openings 18a, 18b, 20a, 20b with highest side openings 18a, 18b of first and second cap 12a, 12b, respectively, at substantially the same height above top surface 14 of tray 16.

In FIG. 1, the characteristic of the tray 16 being installed out of level, as is common in commercial practice due to imperfect installation and/or mechanical stresses occurring in operation, is illustrated by the angle between dashed grade line 25 and top and bottom surfaces 14, 15 of tray 16. As shown, cap 12a and its highest side opening 18a is slightly depressed in absolute elevation relative to cap 12b and its highest side opening 18b. Liquid level 24 (parallel to dashed grade line 25), as it builds on top surface 14 of tray 16, therefore covers highest side opening 18a of first cap 12a, in the depressed region, more completely than it covers highest side opening 18b of second cap 12b in the elevated region. Depending on the extent to which the tray is out of level, the liquid level may totally cover the highest openings of caps in the depressed region and not cover any of the highest openings of caps in the elevated region.

In any event, even slight deviations from complete levelness of tray 16 can significantly impact the distribution of flows, and particularly the liquid flow, over the cross-sectional area of tray 16. In particular, a substantially disproportionate flow of the liquid can occur in the depressed region of tray 16 (e.g., with greater than 75% of the liquid flowing across the depressed half of the cross-sectional area of tray 16). The accompanying maldistribution of liquid and/or vapor flows below tray 16 (e.g., a bed of hydrocracking catalyst), can adversely affect an overall process, as discussed above, in terms of poorer product yield, capacity, and/or catalyst life. All of these consequences have a considerable effect on overall process economics. Furthermore, adjustment of the liquid level has not been shown to easily remedy the maldistribution problem, for the reasons discussed above. For example, the liquid level 24 may be lowered with optional bottom liquid outlet openings 30$a$, 30$b$ to increase liquid flow rate through caps 12$a$, 12$b$. Using the vapor-liquid distributor shown in FIG. 1, for example, increasing the diameter of bottom liquid outlet openings 30$a$, 30$b$ can bring liquid level 24 down to near lowest side openings 20$a$, 20$b$. At this point, however, the same liquid flow maldistribution is observed, such that the liquid level 24 covers lowest side opening 20$a$ of first cap 12$a$, in the depressed region, more completely than it covers lowest side opening 20$b$ of second cap 12$b$ in the elevated region. Furthermore, the liquid level at this point is relatively insensitive to any further adjustments to the liquid flow rate, due to the system "inertia," which relates to the pressure drop across the tray, as discussed above.

Figure 2:
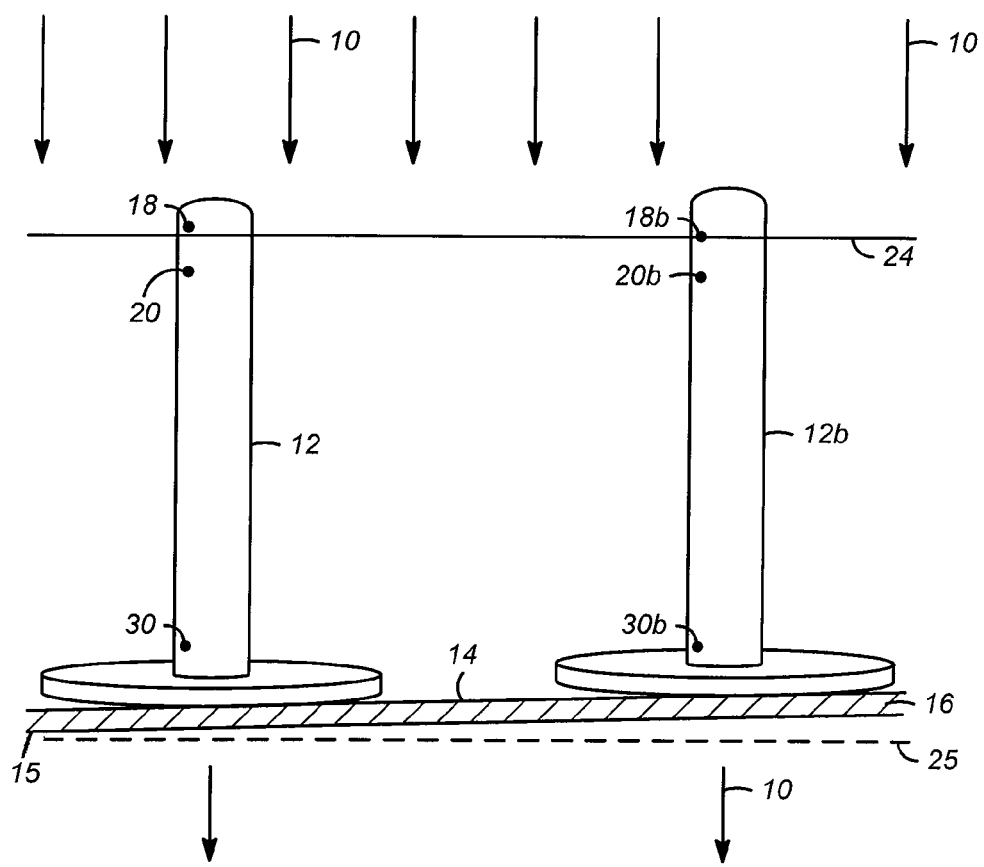
FIG. 2 is a side view of two representative caps of a vapor-liquid distributor according to an embodiment of the invention, in which the highest opening of the cap in a depressed area of the tray is at a greater height above the top surface of the tray, relative to the highest opening of the cap in an elevated area of the tray.

Aspects of the present invention are directed to improving distribution by varying the heights of highest openings above the top surface of the tray. Such varying heights are illustrated in FIG. 2, showing highest opening 18 of first cap 12 now being at a greater height, compared to highest opening 18$b$ of second cap 12$b$, above top surface 14 of tray 16. In this case, "raised" cap 12, although in a depressed region of tray 16, does not receive liquid flow through its highest opening 18, despite liquid level 24 approaching highest opening 18$b$ of "lowered" cap 12$b$.

The characterization of a cap as being "raised" or "lowered" with respect to another cap is based on a comparison of the heights of the highest openings of the respective caps. A highest opening refers to the height to which the opening (e.g., a circular or oval-shaped hole or axially or circumferentially elongated slot) reaches above the top surface of the tray. According to some embodiments, a highest opening of a raised, first cap may extend (e.g., in the case of a slot opening) to a greater height, compared to a highest opening of a lowered, second cap, above the top surface of the tray. According to other embodiments, a highest opening of a raised, first cap may be entirely (e.g., in the case of a hole opening) at a greater height, compared to a highest opening of a lowered, second cap, above the top surface of the tray. In the case of an open-ended cap, the highest opening is normally at the top of the cap, which may have one or more further openings, including a lowest opening, along the side of the cap. In the case of a closed-ended cap, the highest opening may be a discreet opening, such as a hole, being completely within the vertical height of the cap (i.e., not extending upward from the bottom of the cap or extending downward from the top of the cap).

According to further embodiments of the invention, the characterization of a cap as being "raised" or "lowered" with respect to another cap is based on the relative height of its lowest opening with respect to that cap. The lowest opening is typically a side opening, and in many cases the caps have both highest openings (e.g., top openings in the case of open-ended caps) and lowest side openings. Often such caps are designed such that, during operation to distribute the vapor and liquid flows, the liquid level is maintained between these highest and lowest openings, at least for some of the caps (e.g., at least about 25% of the caps), to achieve the desired flow rates across the tray.

Raised caps may therefore have, according to particular embodiments, lowest side openings, which, in addition to highest openings, are at a greater height above the top surface of the tray than both lowest side openings and highest openings, respectively, of lowered caps. Lowest openings, for purposes of characterizing a cap as being raised or lowered, are not meant to include bottom liquid outlet openings that are generally located well below the lowest side openings. These liquid outlet openings, in the case of either the raised or lowered caps, generally, but not necessarily, have larger surface areas than the highest and/or lowest side openings.

Lowest openings, therefore, refer to side openings in the caps that are generally not present (or do not extend into) in the bottom 10%, typically not present in the bottom 25%, and often not present in the bottom 50%, of the total cap length. In the case of a plurality of caps, the height, above the top surface of the tray, of the highest (or lowest) opening of a raised cap may exceed that of the highest (or lowest) opening of a lowered cap by a height difference that effectively counteracts the problems noted above with respect to the tray being out of level. According to some embodiments, therefore, the highest (or lowest) opening of a raised cap is at a height above the top surface of the tray that is generally at least about 0.2 cm (0.08 in), typically at least about 0.5 cm (0.20 in), and often at least about 1 cm (0.39 in) greater than the height of the highest (or lowest) opening of a lowered cap above the top surface of the tray.

FIG. 2 depicts only two representative caps, and it is recognized that, in general, not all caps in the depressed region of the tray are raised. However, the presence of at least some of such raised caps, due to their random or non-random variation or positioning in the depressed region, together with the presence of at least some lowered caps in the elevated region, serves to moderate the changes in pressure drop across the tray, as a function of liquid level. More importantly, the use of raised and lowered caps significantly mitigates flow distribution problems and especially those associated with non-level distributor trays. Therefore, according to particular embodiments of the invention, a plurality of raised caps have highest (or lowest) openings at a greater height, compared to highest (or lowest) openings of a plurality of lowered caps, above the top surface of the tray. The plurality of raised caps, as with the plurality of lowered caps, generally numbers at least about 5, typically at least about 10, and often at least about 20, for a given tray for vapor-liquid distribution as described herein.

The raised and lowered caps may be positioned randomly about the cross-sectional surface area of the tray, but more often they are positioned non-randomly, such as in a pattern about at least a portion of the top surface of the tray, for example in alternating rows about this top surface. In the case of open-ended caps, raised caps may be those that are simply longer, relative to shorter, lowered caps. The use of alternating rows of longer and shorter open-ended caps therefore provides one specific embodiment in which raised and lowered caps are positioned non-randomly. Otherwise, for example, in the case of close-ended caps, alternating rows of raised and lowered caps (i.e., defined as above with respect to their highest or lowest openings) similarly achieves non-random positioning. In general, it is desired to have raised caps positioned at the tray periphery (e.g., close to the wall of the vessel when installed) to counteract the detrimental effects of having liquid flow maldistribution in a depressed region, as discussed above.

Figure 3:
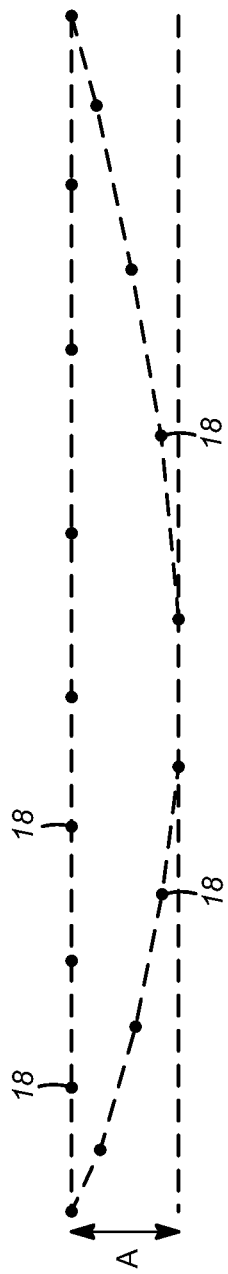
FIG. 3 is a side view showing a configuration of highest openings of caps that are varied non-randomly about the top surface of a tray.

According to other such embodiments in which raised and lowered caps are positioned non-randomly, the height, above the top surface of the tray, of the highest (or lowest) openings of the plurality of caps increases or decreases, normally in a gradual manner. The increase or decrease in height, for example, may be with respect to (or may be a function of) increasing radial distance from the center of the tray (e.g., having a circular cross-sectional shape), about at least a portion of the top surface of the tray. In the case of increasing height, the height of the highest (or lowest) openings of caps may be at a minimum value at or near the center of the tray and increase with increasing radial distance from the center of the tray. For example, the highest (or lowest) openings may define an inverted dome shape. In another particular embodiment exemplifying non-random positioning of caps, highest (or lowest) openings defining an inverted dome shape may have intervening, in the radial direction, highest (or lowest) openings at a constant height being above the height of all openings defining the dome shape. An example of this particular embodiment is depicted in FIG. 3, and such a configuration of highest openings 18 is desirable as flow distribution problems due to a non-level tray are mitigated, regardless of the direction at from which the plane of the liquid level approaches the openings. A maximum distance A between heights of highest openings of caps, which may alternatively apply to lowest openings, generally has values in the ranges given above with respect to the height differences between raised and lowered caps.

Figure 4:
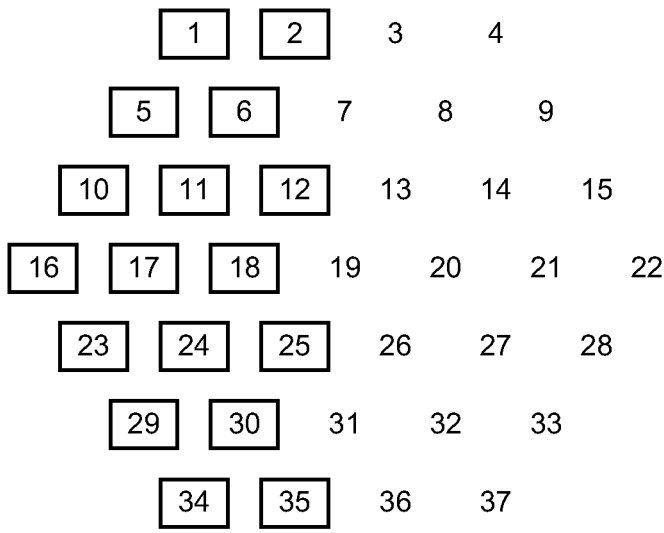
FIG. 4 is a top view of a tray having a plurality of caps, showing flow maldistribution associated with a liquid level covering openings of caps disproportionately in a depressed area of the tray.
Figure 5:
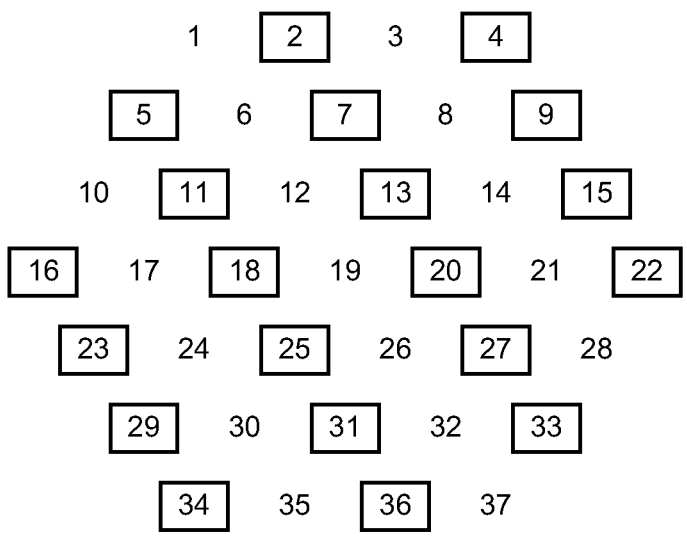
FIG. 5 is a top view of a tray having a plurality of caps, showing improved flow distribution associated caps having openings at varying heights.

FIGS. 4 and 5 illustrate the improvement in flow distribution through a tray, resulting from the use of non-random positioning of raised and lowered caps, in this case being disposed in alternating rows in FIG. 5. These figures were developed by simulating a rising liquid level on a representative tray, having caps 1 through 37 uniformly disposed about its top surface. The simulation involved the tray being out of level, with caps on the left side being in a depressed region of the tray. Shaded boxes around the cap numbers were used to indicate those caps that were covered by the level of the rising liquid. In FIG. 4, the cap openings were all at the same height above the top surface of the tray, and consequently at varying heights above grade level, due to the non-level positioning of the tray. At a liquid level covering nearly half of the cap openings, it is apparent from FIG. 4 that all of the covered openings are in the depressed region of the tray, and consequently the liquid flow is confined to this region, resulting in significant flow maldistribution. In FIG. 5 however, varying the heights of cap openings by using raised and lowered caps, as defined above, in alternating rows resulted in a significant improvement in flow distribution. As shown, at a liquid level covering about half of the openings, the liquid flow is well distributed about the cross-sectional area of the tray, despite the deviation of the tray from levelness.

Overall, aspects of the invention are directed to apparatuses and methods and apparatuses for improving the distribution of vapor and liquid flows in vapor-liquid contacting apparatuses (e.g., reactors or distillation columns) Particular apparatuses comprise a vertically elongated vessel having disposed therein a vapor-liquid distributor as described herein. The vapor-liquid distributor comprises a tray covering, substantially or completely, a cross-sectional area (e.g., circular) of the vessel and further comprises a plurality of elongated, open-ended or closed-ended, caps extending above a top surface (opposite the bottom surface) of the tray and having a top opening or at least one side opening. At least a first (raised) cap has a highest (or lowest) opening at a greater height, compared to a highest (or lowest) opening of at least a second (lowered) cap, above the top surface of the tray. Particular methods comprise passing a vapor and a liquid either co-currently or counter-currently through this apparatus. In view of the present disclosure, it will be seen that several advantages may be achieved and other advantageous results may be obtained. Those having skill in the art, with the knowledge gained from the present disclosure, will recognize that various changes could be made in the above apparatuses and methods without departing from the scope of the present invention. Mechanisms used to explain theoretical or observed phenomena or results, shall be interpreted as illustrative only and not limiting in any way the scope of the appended claims.

The invention claimed is:

1. A process for distributing a vapor and a liquid, the process comprising passing a vapor and a liquid through a plurality of elongated caps extending above a top surface of a tray and having a top opening or at least one side opening, wherein at least a first cap has a highest opening at a greater height, compared to a highest opening of at least a second cap, above the top surface of the tray, the highest opening of the first cap and the highest opening of the second cap being either a top opening or a discreet side opening, wherein both the vapor and the liquid are passed through the plurality of elongated caps co-currently from above the top surface of the tray.

2. The process of claim 1, wherein the highest opening of the first cap extends to a greater height above the top surface of the tray, compared to the highest opening of the second cap.

3. The process of claim 1, wherein the highest opening of the first cap is entirely at a greater height above the top surface of the tray, compared to the highest opening of the second cap.

4. The process of claim 1, wherein a plurality of raised caps have highest openings at a greater height, compared to highest openings of a plurality of lowered caps, above the top surface of the tray.

5. The process of claim 4, wherein the plurality of raised caps numbers at least about 10 and the plurality of lowered caps numbers at least about 10.

6. The process of claim 4, wherein the plurality of raised caps and the plurality of lowered caps are disposed in a pattern about at least a portion of the top surface of the tray.

7. The process of claim 6, wherein the plurality of raised caps and the plurality of lowered caps are disposed in alternating rows about at least a portion of the top surface of the tray.

8. The process of claim 1, wherein a plurality of caps have highest openings at a height, above the top surface of the tray, that decreases or increases with increasing radial distance from the center of the tray, about at least a portion of the top surface of the tray.

9. The process of claim 8, wherein the height, above the top surface of the tray, of the highest openings of the plurality of caps increases with increasing radial distance from the center of the tray, about at least a portion of the top surface of the tray.

10. The process of claim 9, wherein the highest openings of the plurality of raised caps define an inverted dome shape about at least the portion of the top surface of the tray.

11. The process of claim 1, wherein the highest opening of the first cap is at a height above the top surface of the tray that is at least about 1 cm (0.39 in) greater than the height of the highest opening of the second cap above the top surface of the tray.

12. The process of claim 1, wherein the first and second caps each comprise both (i) the highest opening and (ii) a lowest side opening.

13. The process of claim 1, wherein the lowest side opening of the first cap is at a greater height above the top surface of the tray, compared the lowest side opening of the second cap.

14. The process of claim 1, wherein the liquid is maintained at a level between the highest opening and lowest side openings of both the first and second caps.

15. The process of claim 12, wherein the first and second caps each further comprise a bottom liquid outlet opening below the lowest side opening.

16. The process of claim 15, wherein the bottom liquid outlet openings of both the first and second caps have larger surface areas than the highest and lowest side openings.

17. The process of claim 1, wherein the vapor comprises hydrogen and the liquid comprises hydrocarbons.

18. A vapor-liquid contacting apparatus comprising a vertically elongated vessel having disposed therein a tray covering a cross-sectional area of the vessel and comprising a plurality of elongated caps extending above a top surface of the tray and having a top opening or at least one side opening,
wherein at least a first cap has a highest opening at a greater height, compared to a highest opening of at least a second cap, above the top surface of the tray, the highest opening of the first cap and the highest opening of the second cap being either a top opening or a discreet side opening, wherein the tray is installed out of level, and the tray having a depressed region and an elevated region and the at least first cap being present in the depressed region and the at least second cap being present in the elevated region of the tray.

19. A process for distributing a vapor and a liquid, the process comprising passing a vapor and a liquid either co-currently or counter-currently through the apparatus of claim 18.

20. A process for distributing a vapor and a liquid, the process comprising passing a vapor and a liquid through a plurality of elongated caps extending above a top surface of a tray and having a top opening or at least one side opening,
wherein at least a first cap has a highest opening at a greater height, compared to a highest opening of at least a second cap, above the top surface of the tray, the highest opening of the first cap and the highest opening of the second cap being either a top opening or a discreet side opening, wherein the tray is installed out of level, and the tray having a depressed region and an elevated region and the at least first cap being present in the depressed region and the at least second cap being present in the elevated region of the tray.

* * * * *